Sept. 17, 1946.  H. BENIOFF  2,407,644
RANGING SYSTEM
Filed July 29, 1940  3 Sheets-Sheet 1

INVENTOR
Hugo Benioff
BY
ATTORNEY

Sept. 17, 1946.  H. BENIOFF  2,407,644
RANGING SYSTEM
Filed July 29, 1940  3 Sheets-Sheet 2

INVENTOR
*Hugo Benioff*
BY
*ATTORNEY*

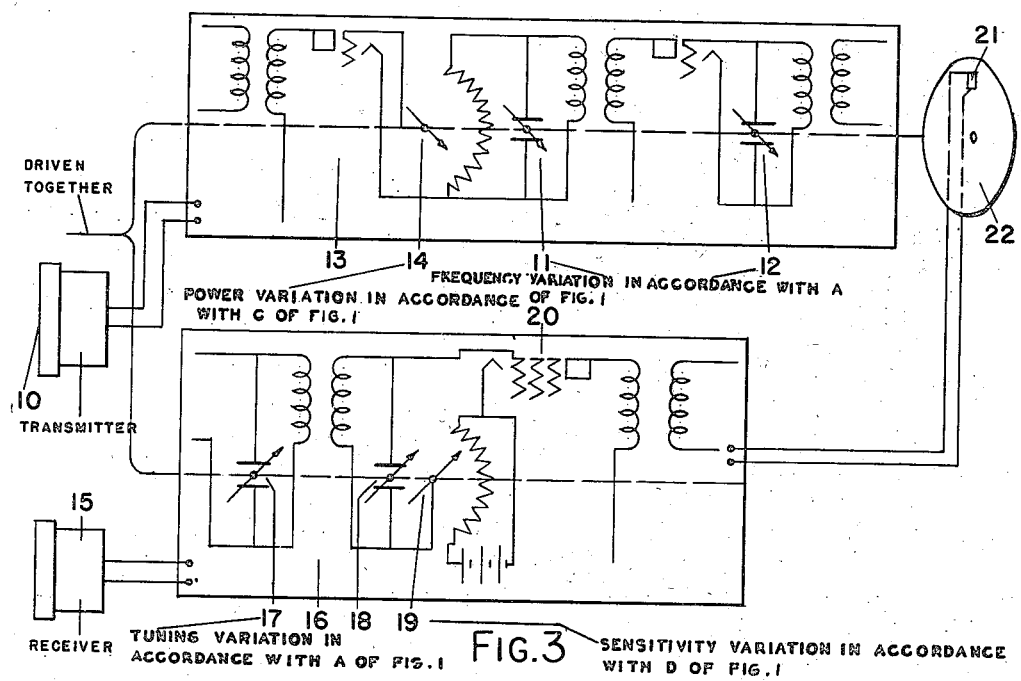
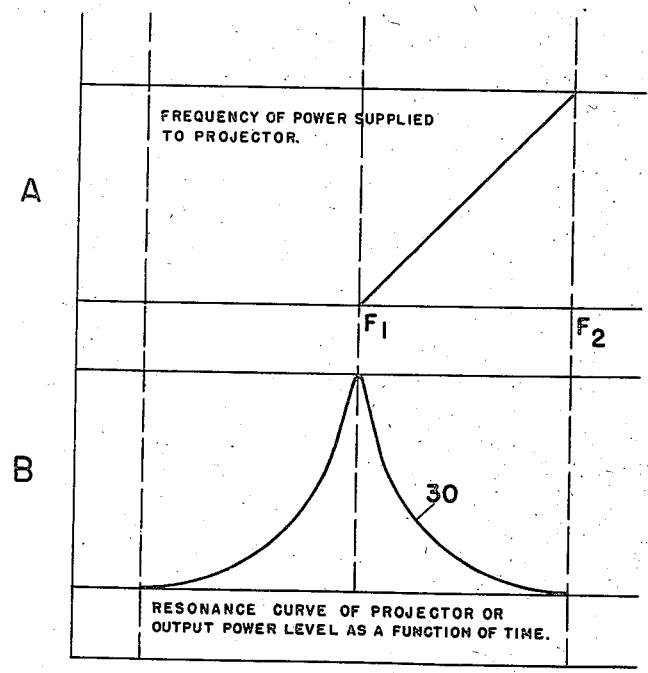

Patented Sept. 17, 1946

2,407,644

UNITED STATES PATENT OFFICE 2,407,644

RANGING SYSTEM

Hugo Benioff, La Canada, Calif., assignor, by mesne assignments, to Submarine Signal Company, Boston, Mass., a corporation of Delaware Application July 29, 1940, Serial No. 348,127

9 Claims. (Cl. 177—352)

The present invention relates to a method of acoustic, supersonic and radio ranging which may be used in the field of submarine signaling for the determination of the distance of obstacles and reflecting surfaces as well as for sound ranging in the air at audible, supersonic and radio frequencies throughout the entire useful radio range.

In sound ranging at supersonic frequencies, particularly for submarine signaling purposes in determining both direction and distance, it is quite common to use a submarine signaling projector from which a beam of compressional waves at supersonic frequencies is emitted and the echo reflected from a distant object picked up by the same or second similar projector to determine both direction and distance. The impulse emitted may be at a constant or varying frequency and for a time interval of the order of $\frac{1}{10}$ of a second. In this method of sound ranging it has been found that the nearby reflecting surfaces such as the bottom, the sides of the vessel and the water surface, which return the reflected signal, produce reverberations which last for a considerable interval after the projector has ceased emitting its sound beam. These reverberations persist for a long period of time with sufficient intensity to interfere with the proper reception of echoes returning from more distant objects. This is true even where the compressional waves are confined in a beam as a result of which the possible reflecting surface is reduced.

In the present invention the system is so arranged that these reverberations do not disturb the operation of the system. This is accomplished principally by cyclic control of both frequency and intensity of the radiated signal as well as the tuning and sensitivity of the receiving apparatus.

Figure 1:
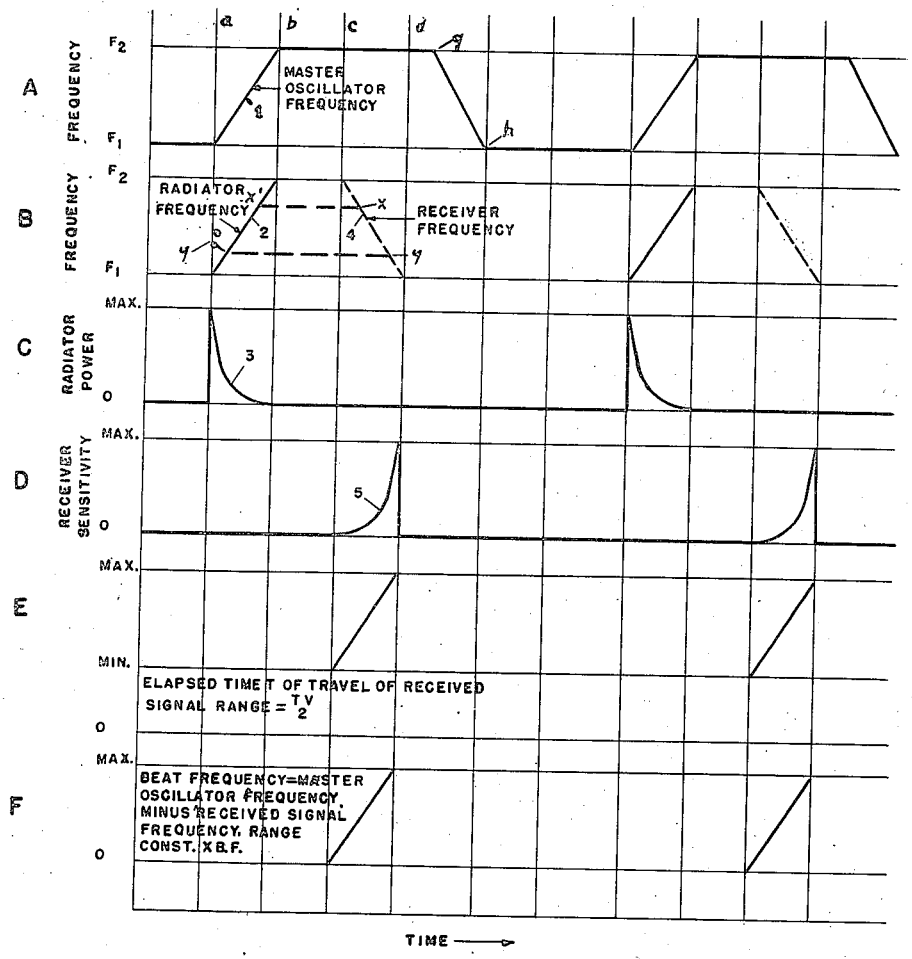
Figure 2:
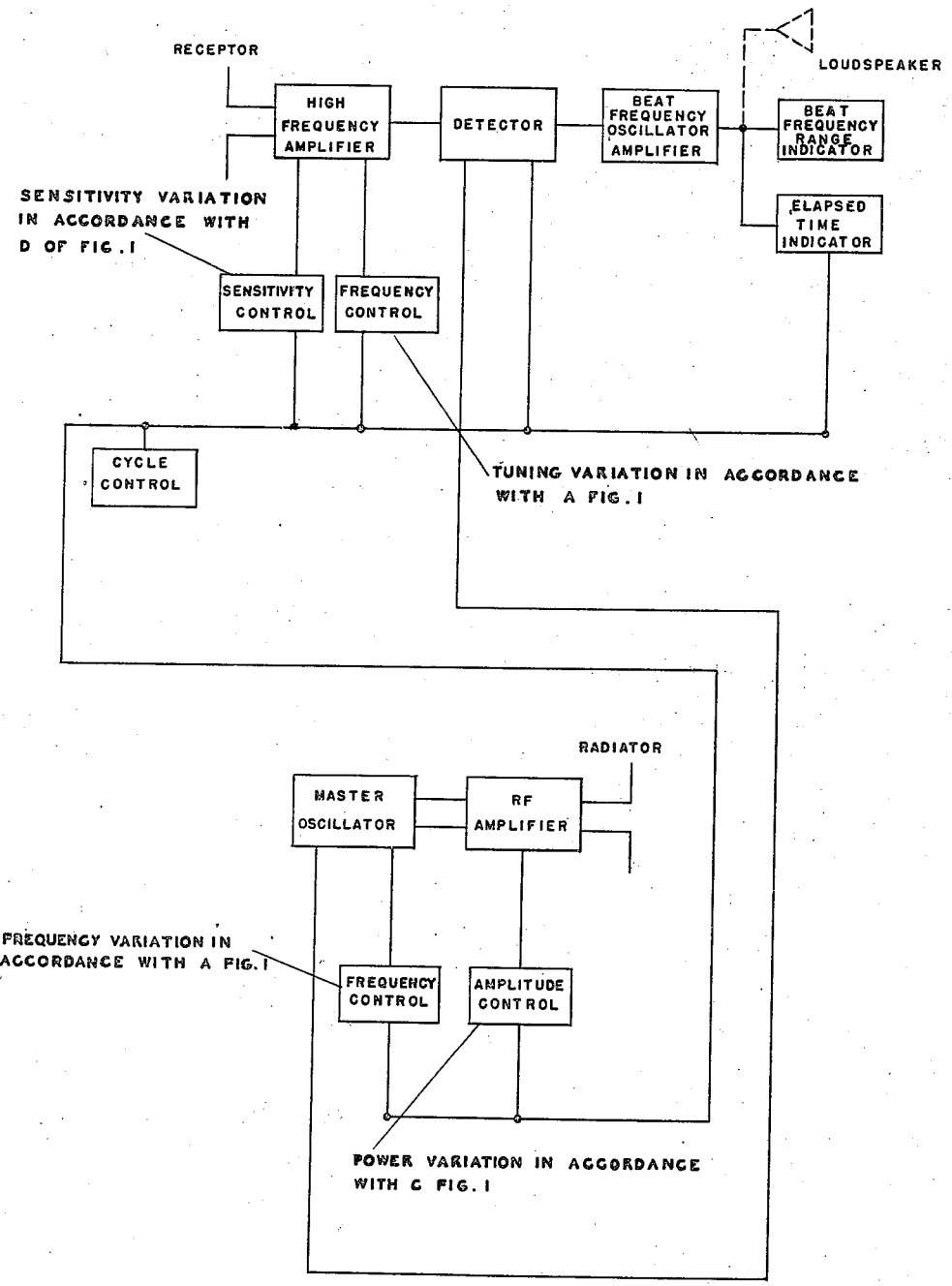

The system will be more completely described in connection with the drawings in which Fig. 1 shows a group of curves illustrating the control and cyclic operation of the transmitting and receiving systems; Fig. 2 shows in block diagram a transmitting and receiving system for radio and supersonic ranging; Fig. 3 illustrates a system adaptable for acoustic or supersonic ranging in accordance with the invention; and Fig. 4 shows a pair of curves of projector resonance and frequency variation which may be used in a modification of the present invention.

In Fig. 1 curve A shows the control of the master oscillator frequency plotted against a time axis. At the point $a$ in the time axis the frequency increases along the curve 1 to the point $b$. From the point $b$ to a point $g$ the frequency remains constant after which the frequency decreases to the starting point $h$ of the second cycle. The curve A, just described, is made up of a group of straight-line curves. It should be noted that other types and forms of curves for curve A may be used and that the curve indicated in the figure might be approximated by a single harmonic function or a combination of straight-line and exponential function. In these cases it is, of course, necessary to adjust the scale of the indicator to correspond. These different types of curves can be controlled either mechanically or electrically by control of capacities and resistances in the driving and receiving circuits. It will be noted that the transmitter or projector in accordance with curve B is only radiating between the points $a$ and $b$ along the curve 2, since at the point $a$, as shown in curve C, the power comes on substantially instantaneously and remains on to the point $b$. This radiated power, as indicated by the section 3 of the curve C, decreases from an initial maximum to zero approximately exponentially or according to some other chosen law. The purpose of this decrease will be more fully explained later.

The control of the receiver is also indicated in the curves of Fig. 1. In accordance with curve B the tuning of the receiver varies from the point $c$ in accordance with the dotted-line section 4 of curve B. This variation in frequency of the receiver starts with a frequency $F_2$ and varies to $F_1$ along a similar curve as the transmitter, which starts at $F_1$ and varies to $F_2$. Similarly, the receiver sensitivity which is indicated in curve D shows in the portion 5 of the curve between the points $c$ and $d$ that the sensitivity of the receiver increases in its cycle from a minimum to a maximum in the reverse of section 3 of the power radiated.

From what has been described above, it will be seen that between the points $b$ and $c$ no power is radiated and no signal is received. This determines the minimum time-interval measurement and distance of the operation of the apparatus, since the shortest time interval between the operation of the transmitter and the operation of the receiver is defined by the distance $bc$ on curve A so that the minimum signal range is equal to $$bc\frac{v}{2}$$

Here, $bc$ is equal to the shortest time interval between the operation of the transmitter and the earliest instant that the receiver becomes operative, while $v$ is equal to the velocity of the signal wave. The frequency received at the minimum distance will be the high frequency at $b$ and since this signal energy travels only a short distance before reflection, the power radiated at this point in the cycle is made small and the sensitivity of the receiver is correspondingly kept at a low value. For signals returning at a greater distance the power output is increased and the receiver sensitivity is raised as indicated by the curves C and D, sections 3 and 5, respectively. Further selectivity and freedom from interference are obtained by simultaneously varying the frequency of the transmitter and receiver to correspond so that the receiver is progressively in condition to receive signals as they arrive from given distances without being sensitive to the arrival of signals from other distances, that is to say, when the receiver is adjusted to the frequency at $x$, the receiver will be in condition to receive the same frequency radiated at $x'$ and the distance will be established by the interval between $x$ and $x'$. At the point $y$ on the curve of the receiving frequency the only distance measurable will be $yy'$ so that for each point on the curve, the frequency at which the receiver will respond, corresponds to a single measurable distance. This is illustrated more clearly in curve E in Fig. 1 where the elapsed time of travel of the received signal is plotted against the time axis.

Curve F in Fig. 1 shows the beat frequency obtained by the beating of a constant master oscillator at a frequency as indicated in curve A, Fig. 1, with the received signal. This curve may be made to increase or decrease with range, depending upon what frequency is chosen for the master oscillator. As the receiver tuning drops from that of the master oscillator, the beat frequency increases corresponding to the elapsed time and gives a definite frequency as a measure of the time and distance.

The system may be operated by the arrangement shown in Fig. 2 in which the elements are given their proper legends. The signal radiated from the radiator, which may be an antenna or a submarine signaling radiator or projector, is supplied with power through the master oscillator and amplifier. The frequency of the master oscillator is controlled in accordance with curve A of Fig. 1 by the frequency-control element which may be a condenser whose capacity is altered by a sinusoidal vibration of one of its plates or by any other suitable method, as, for instance, cam control or capacity variation with the use of a condenser having a rotor and a stator element or the frequency may be controlled by any one of the methods used in frequency modulation for long and short waves, as, for instance, in the manner shown in the patent to Hansell, No. 1,830,166, issued November 3, 1931. A "klystron" type tube may be used for this purpose in which the resonant element may be mechanically, magnetically, electrically or magnetostrictively operated. The frequency may also be controlled by the use of a piezoelectric crystal. The amplitude of the radiated signal, which is controlled in accordance with section 3 of curve C, is controlled by means of the amplitude control connected to the amplifier. Various methods of amplitude control may be used, as, for instance, the control of variation of excitation or by variation of grid and plate potentials. The complete cycle control is indicated by the legend "Cycle control" and may be electrically or mechanically controlled either by means of some standard frequency oscillator or through a standard and constant driving system, as, for instance, where the condensers for varying the frequency are of the rotor type and driven synchronously or on a common shaft.

The receiving system is made up of a receptor which may be a radio receiving antenna or in a sound system a sound receiver of the sonic or supersonic type. The signal received by the receiver is impressed upon an amplifier which may operate in the high frequency range where the signal is in that range or in any other range corresponding to the range of variations of the signals to be received. Corresponding to the amplitude control of the transmitter is a sensitivity control of the receiving amplifier which may be by control of a grid bias or by any of the other systems and methods commonly used. The amplifier is also cyclically controlled through a frequency control shown in the diagram which may be of the usual frequency modulation receivers adaptable for the desired range of reception. With the use of very high frequencies the frequency may be controlled through the variation of tuning of the tube of the "klystron" type.

In the receiving system there is also shown a detector and a beat frequency oscillator amplifier. The beat frequency oscillator amplifier permits the use of a beat frequency range indicator in the present invention, the range being indicated by the corresponding frequency established through the beating of the beat frequency oscillator and the received signal. In addition to the distance and elapsed time being determined in this way, an elapsed time indicator may also be provided, the indicator in this case being driven through the cycle control and being operated by the signal received by the receiver. The elapsed time indicator may be a rotating disc carrying a neon light which is illuminated when the signal is received.

A system adaptable for acoustic and supersonic systems is indicated diagrammatically in Fig. 3. Here the transmitter 10 sends out a signal in accordance with curves A and B of Fig. 1, the tuning or frequency of the signal being controlled by the variable rotating condensers 11 and 12 and the power radiated being controlled by variable excitation in the input grid circuit of the oscillator 13 by means of the rotating potentiometer arm 14. In the receiving system the receiver 15 impresses the signal received into the receiving circuit 16 which goes through a cyclic tuning stage effected by the rotation of the condensers 17 and 18 for tuning the receiving circuit. The sensitivity of the receiving system is controlled by means of the rotating potentiometer arm 19 which varies the bias on the grid 20 of the receiving tube. The signal received is made to operate the neon indicator 21 mounted on the rotating disc 22. In the system above described the rotating disc 22 and all of the other rotating elements, such as 11, 12, 14, 17, 18 and 19, are rotated either on the same shaft or at the same speeds by means of synchronous motors or positive driving connections. In these cases the various elements are phased to produce the cyclic operation described in connection with Fig. 1.

A different method of obtaining the radiating power output curve may be employed by using the resonance curve of the projector or sound transmitter. A resonance curve of this type is shown in curve B of Fig. 4 where the power amplitude is plotted as an ordinate against frequency as the abscissa. It will be noted that the projector need not have a flat characteristic over the frequency range and that as a matter of fact in the present case the resonance of the projector is advantageously used. By varying the frequency between the peak $f_1$ of Fig. 4 and the point $f_2$ in accordance with section 2 of curve B of Fig. 1 the power output will decrease as indicated by the section 39 of curve B of Fig. 4 similar to that of section 3 in curve C in Fig. 1. This system may particularly be employed with a submarine signaling projector. For this purpose any fairly sharp transmitter may be used as, for instance, a so-called Fessenden oscillator, or a tuned diaphragm device magnetically or dynamically operated or any of the well-known devices of which there are many. As references the applicant refers to the Fessenden Patent No. 1,167,366, issued January 4, 1916, and the Hecht et al. Patent No. 1,604,693, issued October 26, 1926.

This provides a distinct advantage over the visual indicating system in that it need not be watched continually to indicate whether an object is within range and, further, the pitch of the audible signal will thus be an indication of the distance of the object.

In the system which has just been described it should be noted that the reverberations of the high-powered signal initially sent out will not affect the receiver when it is put in condition to receive the signal, for not only is the tuning of the receiver such that the receiver is unable to handle this signal, but also it is some time later before the receiver is in proper condition to be operated.

The minimum measuring distance, as has been stated, is determined by the time interval represented by the points $b$ and $c$. The maximum time interval is determined by the time interval represented between points $a$ and $d$. By using a compartively slow modulation of frequency and intensity the system may be made to cover a range from the minimum to the maximum to which the energy will travel and be reflected.

Having now described my invention, I claim:

1. A standby system for obstacle detection and distance measurement comprising means for sending out a signal modulated in frequency and amplitude progressively in repeated cycles in conformity to a determinable curve, means for receiving the signal sent out after reflection from an obstacle or distant reflecting surface and means for adjusting the tuning and sensitivity of the receiving means to follow substantially the same determinable curve but in reverse direction to that of the signal sent out with regard respectively to frequency and amplitude.

2. A standby system for obstacle detection and distance measurement comprising means for sending out a signal modulated in frequency progressively in repeated cycles in conformity to a determinable curve, means for progressively decreasing the signal amplitude from a maximum to zero contemporaneously with the frequency modulation and means for adjusting the tuning and sensitivity of the receiving means to follow substantially the same determinable curve but in reverse direction to that of the signal sent out with regard respectively to frequency and amplitude.

3. A standby system for obstacle detection and distance measurement comprising means for sending out a signal modulated linearly in frequency in a portion of a repeated cycle in conformity to a determinable curve, means for progressively decreasing the signal amplitude from a maximum to zero contemporaneously with the frequency modulation and means for adjusting the tuning and sensitivity of the receiving means to follow substantially the same determinable curve but in reverse direction to that of the signal sent out with regard respectively to frequency and amplitude.

4. A standby system for obstacle detection and distance measurement comprising means for sending out a signal modulated linearly with increasing frequency during at least a portion of a repeated cycle in conformity to a determinable curve, means for progressively decreasing the signal amplitude from a maximum to zero during said same portion of the repeated cycle and means for adjusting the tuning and sensitivity of the receiving means to follow substantially the same determinable curve but in reverse direction to that of the signal sent out with regard respectively to frequency and amplitude.

5. A standby system for obstacle detection and distance measurement comprising means for sending out a signal modulated linearly with respect to frequency during at least a portion of a repeated signal cycle in conformity to a determinable curve, means for progressively decreasing the signal amplitude from a maximum to zero during said same portion of the repeated cycle and thereafter maintaining a zero amplitude until the said same portion of the cycle is repeated and means for adjusting the tuning and sensitivity of the receiving means to follow substantially the same determinable curve but in reverse direction to that of the signal sent out with regard respectively to frequency and amplitude.

6. A standby system for obstacle detection and distance measurement comprising means for sending out a signal modulated in frequency progressively in repeated cycles in conformity to a determinable curve, means for progressively decreasing the signal amplitude from a maximum to a zero value down a portion of said cycle and maintaining the amplitude at substantially zero until said portion of the cycle is repeated, means for receiving the signal sent out after reflection from an obstacle or distant reflecting signal and means for varying the tuning and sensitivity of the receiving means to follow substantially the same determinable curve but in reverse direction to that of the signal sent out with regard respectively to frequency and amplitude and means providing a constant frequency for producing a beat note with the signal received, said beat note being adapted to establish the distance to be measured.

7. A standby system for obstacle detection and distance measurement comprising means for sending out a signal modulated in frequency progressively in repeated cycles in conformity to a determinable curve, means for progressively decreasing the signal amplitude from a maximum to a zero value down a portion of said cycle and maintaining the amplitude at substantially zero until said portion of the cycle is repeated, means for receiving the signal sent out after reflection from an obstacle or distant reflecting signal and means for varying the tuning and sensitivity of the receiving means to follow substantially the same determinable curve but in reverse direction to that of the signal sent out with regard respectively to frequency and amplitude and time measuring means synchronously operated with said cycle for indicating the elapsed time between the transmission of a portion of the signal cycle and the receipt of its reflected echo.

8. A method of obstacle and distance measurement which comprises transmitting a signal varying both in frequency and amplitude according to a determinable curve, receiving the signal after reflection from the obstacle or distant reflecting surface, varying during the receiving period tuning and sensitivity of the receiving system according to said determinable curve but in reverse direction corresponding to a time schedule for the return of reflected signals from the nearest to the most distant object in the range to be observed whereby the receipt of the signal and its corresponding frequency identity determines the distance of the object.

9. A method for obstacle detection and distance measurement comprising sending out periodically signals linearly modulated in frequency and decreasing in amplitude from an initial maximum value to zero according to a determinable curve, receiving said signals sent out at a time interval later than the end of the transmitted signal, increasing the sensitivity of reception and varying the tuning thereof linearly according to said curve but in reverse progression from that employed in the transmission of the signal whereby the listening area is progressively swept away from the listening point, and indicating by the frequency of the received signal the distance being measured.

HUGO BENIOFF.